(12) United States Patent
Snipes et al.

(10) Patent No.: US 8,132,521 B2
(45) Date of Patent: Mar. 13, 2012

(54) VOLUMETRIC METERING SYSTEM WITH SECTIONAL SHUT-OFF

(75) Inventors: Terry L. Snipes, East Moline, IL (US); Stanley R. Borkgren, Geneseo, IL (US)

(73) Assignee: Deere & Company, McLine, IL (US)

( * ) Notice: Subject to any disclaimer, the term of this patent is extended or adjusted under 35 U.S.C. 154(b) by 114 days.

(21) Appl. No.: 12/481,254

(22) Filed: Jun. 9, 2009

(65) Prior Publication Data

US 2010/0307394 A1    Dec. 9, 2010

(51) Int. Cl.
*A01C 7/00* (2006.01)
*A01C 9/00* (2006.01)

(52) U.S. Cl. ........................................ 111/182; 111/178

(58) Field of Classification Search .......... 111/177–182, 111/170, 200, 900; 342/357.07
See application file for complete search history.

(56) References Cited

U.S. PATENT DOCUMENTS

| | | | |
|---|---|---|---|
| 4,023,707 A * | 5/1977 | Johnson | 222/1 |
| 5,826,523 A | 10/1998 | Gregor | |
| 5,878,679 A | 3/1999 | Gregor et al. | |
| 2009/0079624 A1 | 3/2009 | Dean et al. | |

FOREIGN PATENT DOCUMENTS

| | | | |
|---|---|---|---|
| AT | 383720 B | * | 8/1987 |
| CA | 2311698 A1 | * | 12/2001 |
| EP | 2022309 A1 | | 2/2009 |
| GB | 2056237 A | * | 3/1995 |

OTHER PUBLICATIONS

European Search Report received Nov. 2, 2010 (4 pages).

* cited by examiner

*Primary Examiner* — Christopher J. Novosad (57) ABSTRACT

A volumetric metering system for a seeding machine is provided with movable gates disposed downstream from the meter roller but before the product enters a distribution system to selectively stop the flow of product through sections of the metering system. By placing the shut-off gate after the meter but before product enters the distribution system, there will not be a delay in stoppage of product flow while the meter empties of product. Furthermore, by locating the gate before the distribution system, the metered product is not mixed with the air stream or with additional products, causing a need for product redirection into a pressurized tank or separation of multiple products.

10 Claims, 7 Drawing Sheets

VOLUMETRIC METERING SYSTEM WITH SECTIONAL SHUT-OFF

FIELD OF THE INVENTION

The present invention relates to a volumetric seed meter and in particular to such a seed meter having sectional meter shut-off.

BACKGROUND OF THE INVENTION

Volumetric meters are commonly used in agricultural seeding implements such as grain drills and air seeders to meter the seed. Volumetric meters are also used with fertilizer applicators. A volumetric meter often employs a meter roller contained within a housing that defines an inlet for receiving product from a tank, typically located above the meter roller to feed seed into the housing by gravity. The meter roller is fluted so that as the roller is rotated, product from the tank is carried to an outlet in a controlled manner based on the size of the roller flutes and speed of rotation of the roller. From the meter housing, the seed is carried by a distribution system for dispensing to the soil. The distribution system typically includes a number of individual channels each receiving seed from a defined section of the meter roller. The distribution system may be a gravity system that guides the seed as it falls downward from the meter to the soil. Alternatively, the distribution system may be pneumatic, using flowing air to distribute the seed from the meter. A pneumatic system may also further divide the seed delivered from the meter to one channel of the distribution system into multiple individual row distribution tubes.

In contrast to a volumetric seed meter, row crop planters use individual seed meters located at each row unit. These meters are supplied by either individual seed hoppers mounted to the row unit or supplied with seed from a central tank, often with a pneumatic system to deliver the seed. The seed meters, however, instead of metering the seed based on volume, singulate the seed and deliver one or more seeds upon specified intervals. Recent products have been made available on row crop planters that shut-off the flow of seed at the individual row units. This is often accomplished by a clutch mechanism in the seed meter drive that is actuated to disengage the seed meter drive. These have met with commercial success as customers seek to control costs by eliminating any double seeding which can occur at the edge of a field when the area remaining to be seeded is not as wide as the planter or in a non-rectangular field where the rows do not all end at the same location or when crossing waterways that are covered with grass and are not to be seeded. Since the seed shut-off is at the individual meter mounted on the row, there is only a short or no delay from the time the meter is shut-off to stoppage of the seed flow at the soil.

To provide a similar shut-off on a volumetric meter having an air, i.e. pneumatic, distribution system, a number of unique challenges must be overcome that do not exist with a row crop planter. These challenges include: 1) if seed is stopped from flowing into the meter, there is a long delay until seed stops flowing at the discharge since the meter must empty before seed flow stops; 2) air seeders may mix multiple products within the airstream so that stopping the flow of seed to the ground by redirecting the flow after the seed is introduced into the airstream requires separation of the mixed products; and 3) with some air seeders, the product tanks are pressurized during operation, further complicating the return of redirected product to the tank.

One approach to providing a sectional meter shut-off is shown in US patent application publication number 2009/0079624, published Mar. 26, 2009. Slidable gates are positioned between the product storage tank and the meter roller. Individual actuators are provided to move each gate between open and closed positions. Because the gates are positioned between the storage tank and the meter, after actuation of the shut-off actuators, product will continue to flow until the meter is emptied of product. This arrangement does nothing to address the first challenge listed above. In addition, the sliding gate must "cut" through seed flowing from the product tank generally perpendicular to the direction of motion of the sliding gate.

SUMMARY OF THE INVENTION

The present invention provides a volumetric metering system with movable gates disposed downstream from the meter roller but before the product enters a distribution system. By placing the gate in this location, product flow will stop more quickly after shut-off then with the device shown in the above patent application as the meter roller does not first have to empty itself of product. Furthermore, by locating the gate before the distribution system, be metered product is not mixed with the air stream or with additional products, causing a need for product redirection into a pressurized tank or separation of multiple products.

DESCRIPTION OF THE PREFERRED EMBODIMENT

Figure 1:
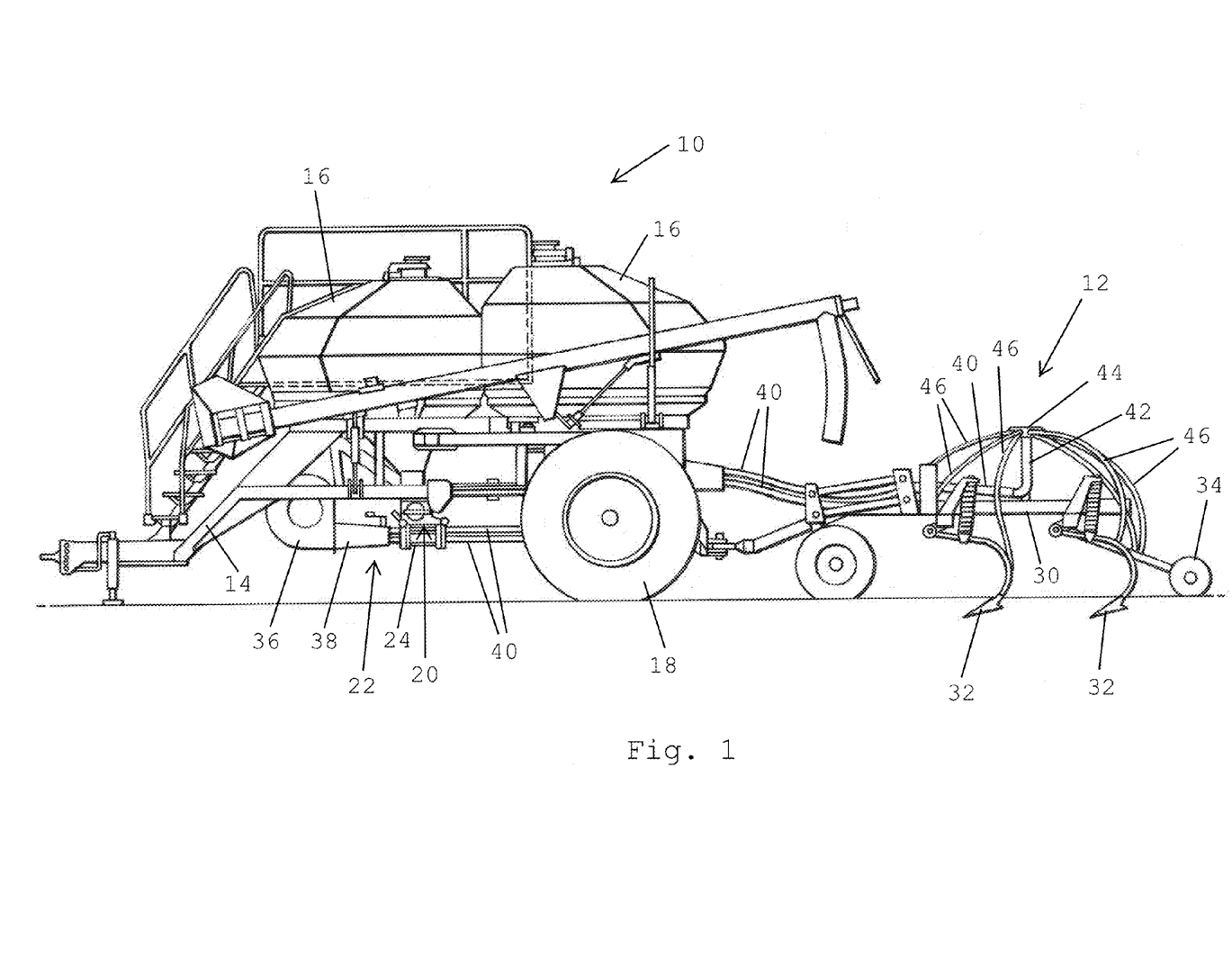
FIG. 1 is a side elevational view of an air seeder and tiling implement having the sectional meter shut-off of the present invention.

An air seeder constructed according to a preferred embodiment of the present invention is shown in the figures. With reference to FIG. 1, an air seeder is shown comprising of a seed cart 10 towed between a tractor (not shown) and a tilling implement 12. The seed cart 10 has a frame 14 to which product tanks 16 and wheels 18 are mounted. Each product tank 16 has an associated metering system 20 at its lower end for controlled feeding of product into a pneumatic distribution system 22 at a primary distribution manifold 24. The tilling implement 12, towed behind the seed cart 10, consists generally of a frame 30 to which ground openers 32 are mounted. Incorporation of seed row finishing equipment such as closing wheels 34 is also desirable in many applications.

The pneumatic distribution system 22 includes a centrifugal fan 36 connected to a plenum 38, which is in turn connected to one or more primary distribution manifolds 24, each associated with a product tank 16. The individual passages in the primary distribution manifold 24 are each connected by a distribution line 40 to a riser tube 42, only one of which is shown. Each riser tube 42 is in turn coupled to a secondary distribution header 44. Distribution lines 46 connect the secondary distribution header 44 to seed boots mounted on the ground openers 50 to deliver product, seed or fertilizer, etc. to the furrow formed by the openers 32. Further detail of the air seeder can be found in U.S. Pat. No. 5,878,679, hereby incorporated by reference. While the air seeder of FIG. 1 is shown as a separate air cart connected to a tilling implement, the product tanks 16, metering system 20 and distribution system 22 can be mounted to the same frame as the ground openers 32.

The metering system 20 will now be described in greater detail with reference to FIGS. 2-5. Metering system 20 includes a housing 50 having an upper end 52 that is coupled to a product tank 16. The housing 50 further has a lower end 54 that is coupled to the primary manifold 24 of the pneumatic distribution system. The housing 50 forms an inlet passage 56 through which product is received into the housing and an outlet passage 58 through which metered product is delivered to the distribution system. A rotary cut off valve 60 is placed in the inlet passage 56 and can be rotated as shown by the arrow 62 from the open position shown in FIG. 2 to a cleanout position in which product is discharged from the housing 50 to enable the product tank 16 to be emptied without the product flowing through the meter to the distribution system.

Figures 4, 4A:
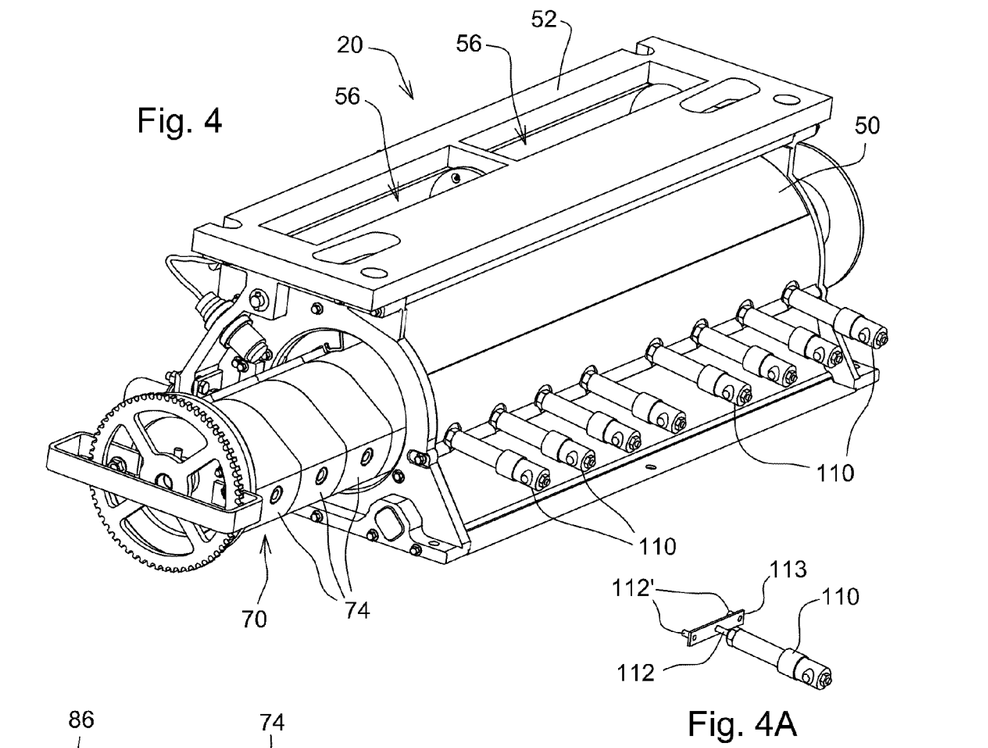
FIG. 4 is a perspective view of the seed meter shown in FIG. 2.
FIG. 4a is a perspective view showing an actuator capable of closing two gates.
Figure 5:
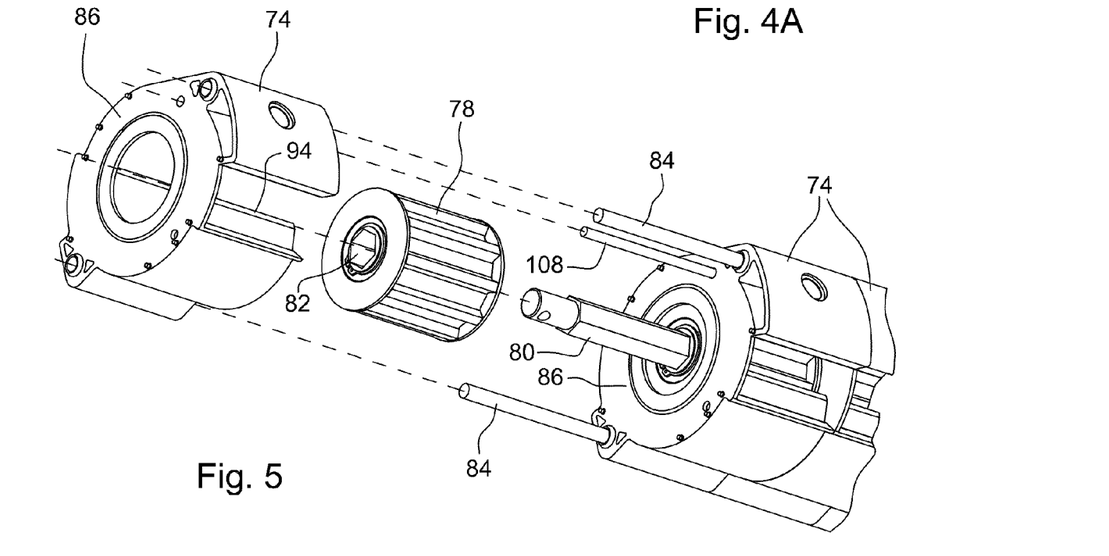
FIG. 5 is an exploded perspective view of the meter cartridge illustrating one meter casing and one roller segment separated from the cartridge.

The inlet passage 56 leads to a meter cartridge 70 which houses a meter roller 72. The cartridge 70 is removable from the meter housing 50 as shown in FIG. 4 where the cartridge 70 is shown partially withdrawn from the housing 50. The cartridge consists of a plurality of meter casings 74 placed adjacent to one another and fastened together by elongated bolts 84, FIG. 5, extending through apertures 76 in the meter casings. The meter roller 72 is constructed of a plurality of roller segments 78 axially positioned along a drive shaft 80. In the embodiment shown, the drive shaft 80 is hex shaped to mate with the hex shaped bore 92 in the roller segments 78. Additional attaching hardware is shown and described in the above referenced U.S. Pat. No. 5,878,679.

Figures 2, 3:
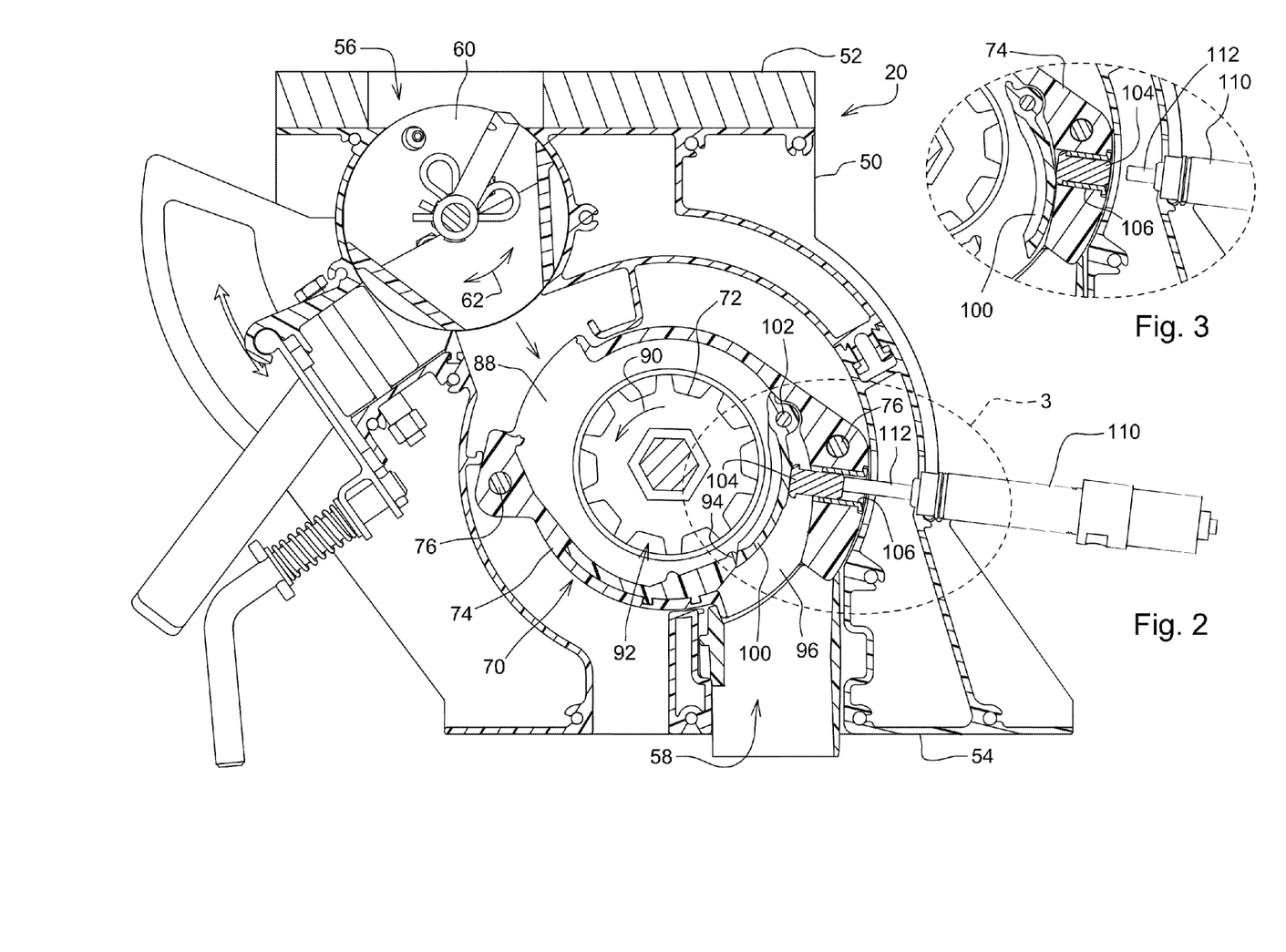
FIG. 2 is a side elevational view of the seed meter of the air seeder shown in FIG. 1.
FIG. 3 is a side elevational view of the portion of FIG. 2 in the circle 3 illustrating the actuator rod in a retracted position.

Each roller segment 78 is disposed within a separate meter casing 74. Each meter casing 74 has a radial wall 86 along one axial end of the casing that separates adjacent roller segments from one another axially along the shaft 80. Each casing 74 defines an inlet 88 in communication with the inlet passage 56 of the meter housing for receiving product therefrom. As the meter roller 72 rotates, as shown by the arrow 90 in FIG. 2, product is displaced by the teeth and grooves 92 of the rollers, over the ledge 94 to the outlet 96 in the meter casing. From there product flows to the outlet passage 58 in the meter housing and to the manifold 24 of the distribution system 22. For each meter casing, a shut-off gate 100 is provided to selectively shut-off the flow of seed from a given section of the meter roller. A shut-off gate is shown in FIG. 2 in the closed position preventing product from flowing over the ledge 94. The shut-off gate is pivotally mounted to the meter casing at pivot 102 near a proximal end of the gate. A pivot rod 108, FIG. 5, extends axially through the cartridge to pivotally mount the shut-off gates 100. Each gate 100 is held in the closed position by a plunger 104 that is slidalby moved within a sleeve 106 in the meter casing. Actuators 110 are mounted to the meter housing 50 with the majority of the body of the actuators 110 extending outwardly from the housing as shown in FIGS. 2 and 4. The actuators have an extendable rod 112 which extends into the sleeve 106 and bears against the plunger 104 as shown in FIG. 2 when the actuator is in the energized state. Preferably the actuator rod is spring biased to the retracted position so that the rod remains retracted when the actuator is in the non-energized state. The terms energized and non-energized mean when the actuating power is present or not present and can be electric, pneumatic, hydraulic, etc. When retracted, the ends of rods 112 are contained within the housing 50 as shown in FIG. 3, completely withdrawn from the meter casing. This allows the meter cartridge 70 to be removed from the housing 50 as shown in FIG. 4. The plungers 104 and sleeves 106 are contained within the respective meter casings so as to not interfere with the housing 50 during insertion or removal of the cartridge 70 into and from the housing 50.

Figure 6:
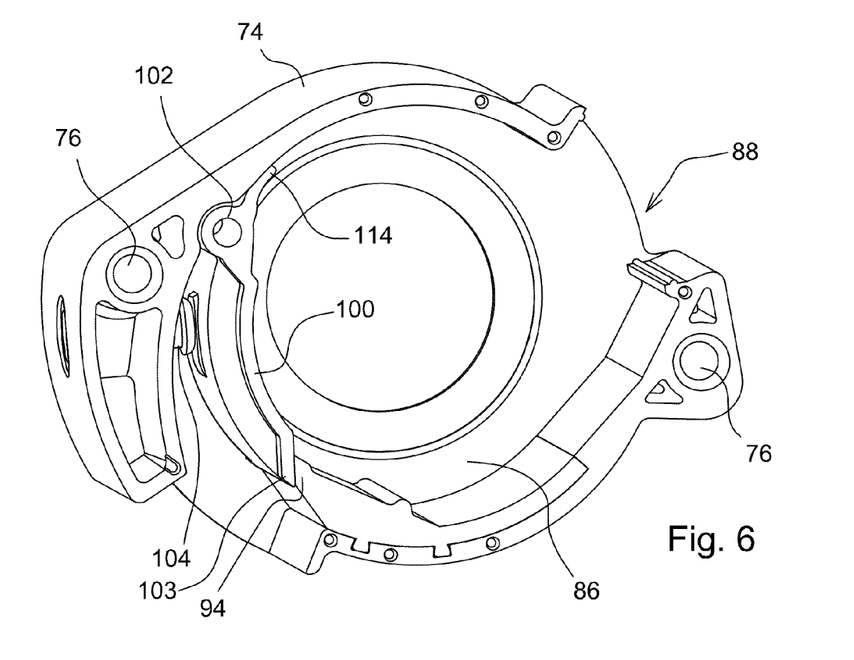
FIG. 6 is a perspective view of the seed meter casing illustrating the gate in the closed position.
Figure 7:
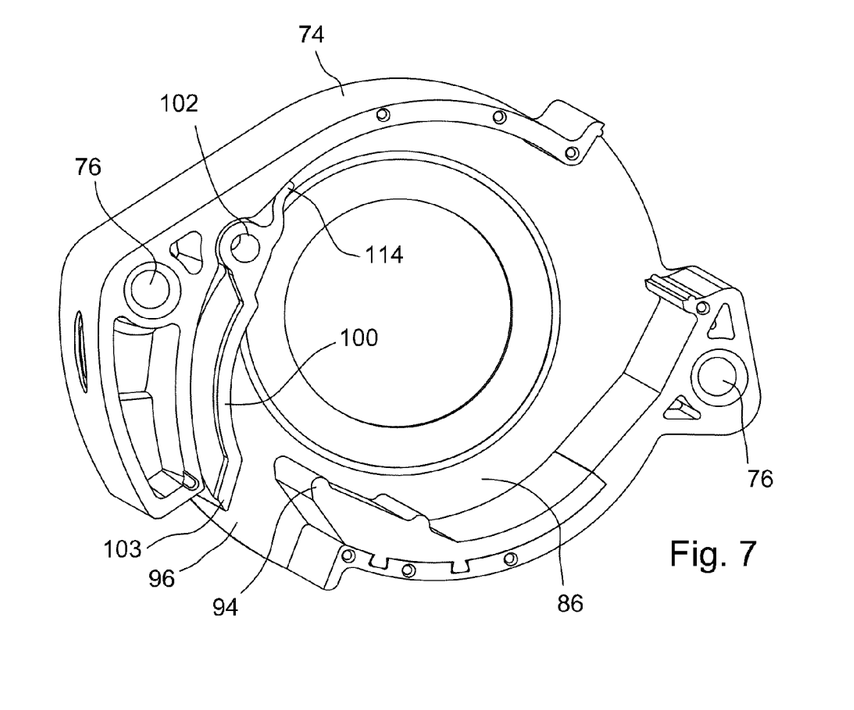
FIG. 7 is a perspective view of the seed meter casing shown in FIG. 6 illustrating the gate in the open position.

A meter casing and shut-off gate are shown in greater detail in FIGS. 6 and 7. In FIG. 6 the gate 100 is shown in the closed position in which a distal end 103 of the gate bears against or is adjacent the ledge 94 to prevent product from flowing over the ledge. In FIG. 7, the gate is shown in the open position, spaced from the ledge 94, allowing product to flow over the ledge to the outlet 96. The gate 100 is integrally formed with a spring tab 114 extending upward from the pivot 102 as shown in FIGS. 6 and 7. The spring tab bears against an inner surface of the casing member 74 in the open position shown in FIG. 7. When the gate is moved to the closed position, the spring tab 114 is deflected as shown in FIG. 6. When the rod 112 of the actuator 110 is retracted, the spring tab provides a biasing force to move the gate 100 to the open position. Separate spring members can be used between the gate and the casing member to bias the gate to the open position in place of the integral spring tab 114. These could include a tension spring between the gate and casing near to distal end 103 of the gate or a coil spring at the pivot 102.

The actuators 110 can be electronic, pneumatic, hydraulic, or any other actuator that provides the desired motion and are preferably electronically controlled. The actuators 110 can be controlled selectively by the operator through a control panel in the tractor cab or, preferably, the actuators are controlled by field mapping software in combination with GPS or other vehicle positioning system. With the use of field maps and vehicle positioning, the actuators will be activated to close product flow from the meter, and thus stop product flow to one or more of the distribution lines 40 which supply product to one or more rows of the tilling implement 12, as the tilling implement covers area which has already been seeded or which should not be seeded.

As shown in FIG. 4a, the actuator 110 can have its rod 112 coupled to a cross bar 113 that in turn supports a pair of rod stubs 112'. Such an arrangement allows the actuator to control two gates or more if desired. While having one actuator per gate may be the preferred embodiment, that may actually provide more precise control than is available from the field mapping software and vehicle positioning system. Thus, closing two or more gates simultaneously may provide the maximum benefit possible in terms of reduced input cost.

Figure 8:
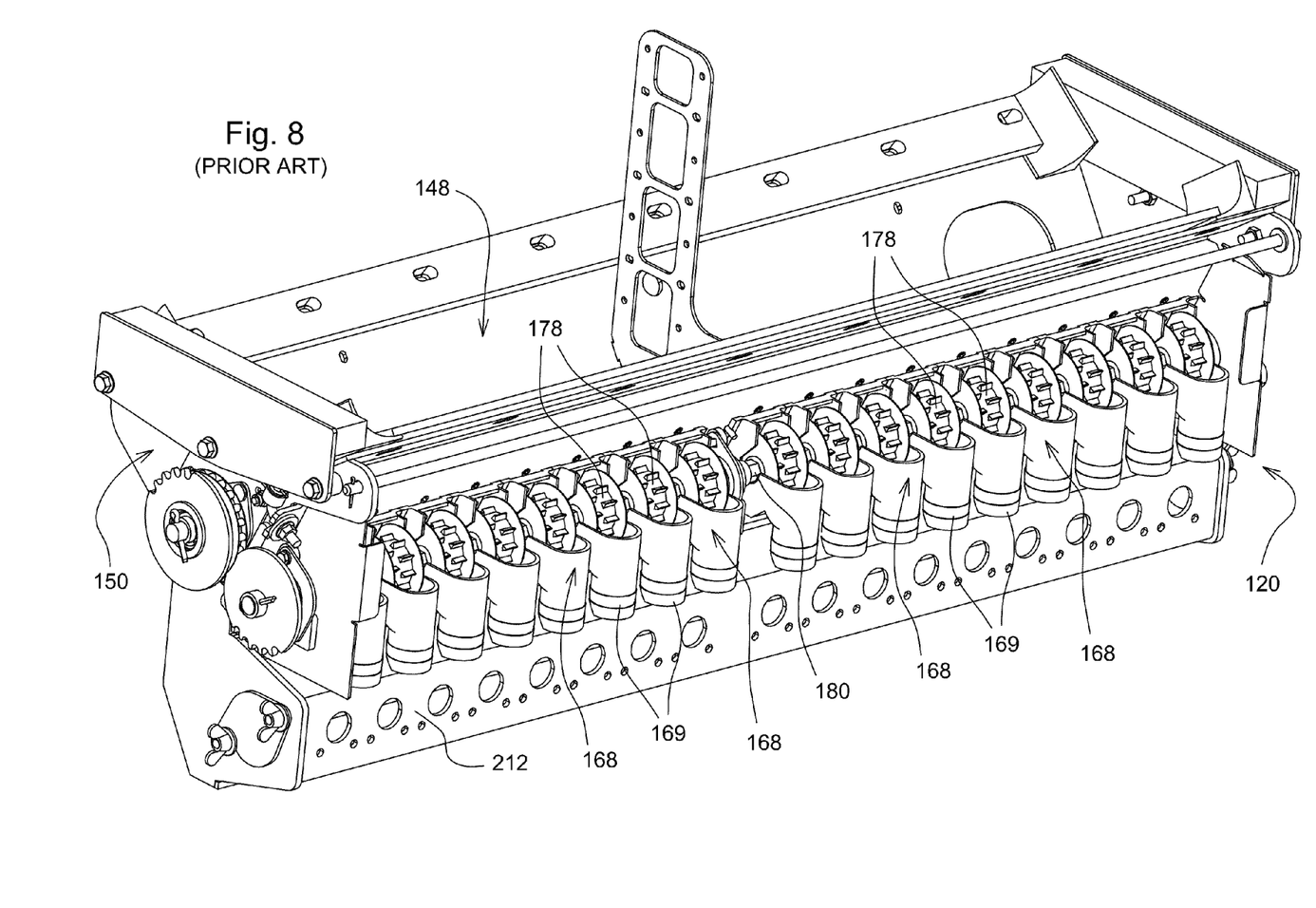
FIG. 8 is a perspective view of a prior art volumetric meter before the addition of an other embodiment of the sectional meter shut-off according to the present invention.

An alternative implementation of the invention is shown in FIGS. 8-12. Here the pivoting shut-off gates are incorporated into a different meter, in this case, the meter is from a John Deere 1990CCS No-Till Air Drill. The metering system 120 is shown in FIG. 8 without the sectional shut-off of the present invention to provide the context for the invention. The metering system 120 includes a meter box assembly 150 upon which a product tank (not shown) is supported and supplies product into the open interior 148 of the meter box assembly. A metering system drive shaft 180 is supported by meter box assembly and carries a meter roller having a plurality of roller segments 178. The roller segments 178 are axially spaced from one another along the length of the drive shaft 180. Surrounding each roller segment is a feed cup 168 which is open to the interior 148 of the meter box assembly to receive product therefrom. Each feed cup 168 also forms an outlet tube 169 to direct product to the air stream of the product distribution system 122 shown in FIGS. 9, 10 and 12.

Figure 9:
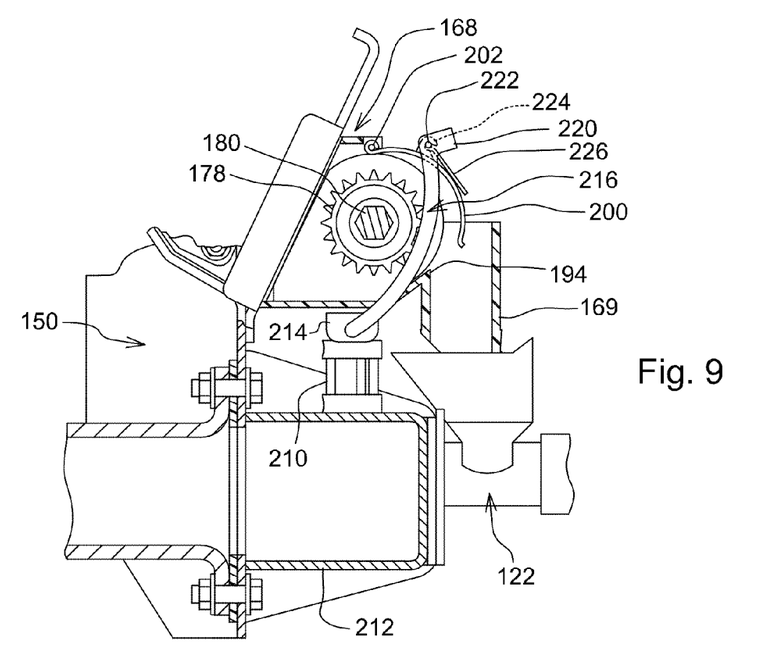
FIG. 9 is a side sectional view of the meter of FIG. 8 with the addition of the sectional meter shut-off according to the present invention illustrating the shut-off gate in the open position.
Figure 10:
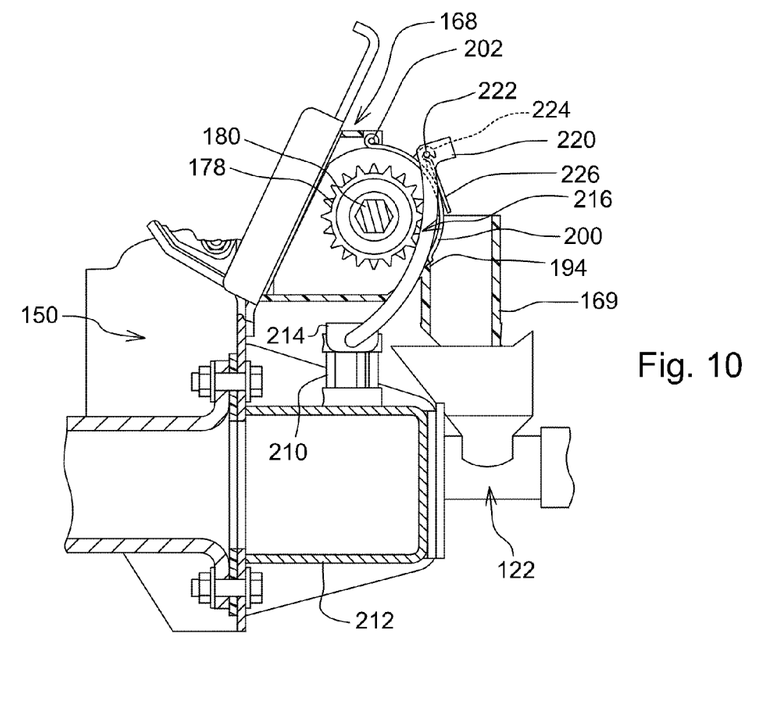
FIG. 10 is a side sectional view of the meter of FIG. 9 illustrating the shut-off gate in the closed position.
Figure 11:
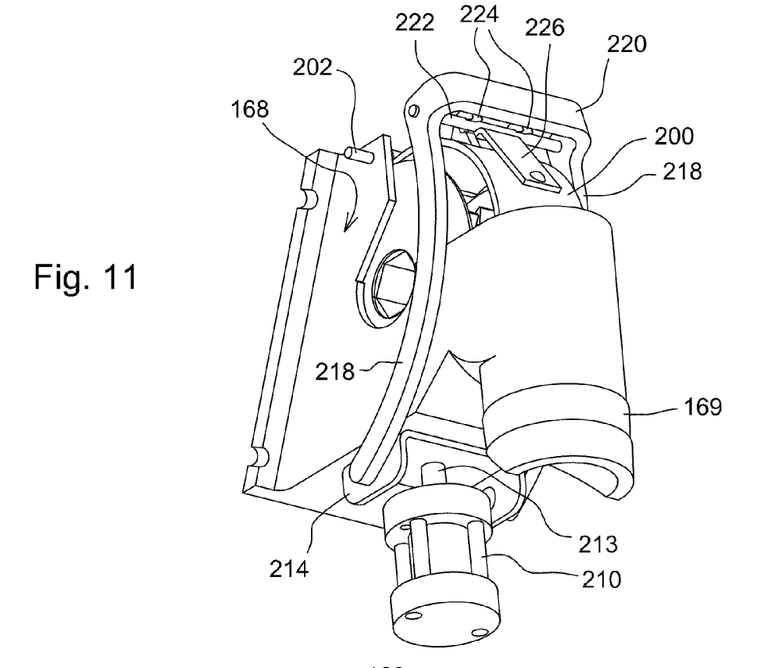
FIG. 11 is a bottom perspective view of the feed cup and sectional meter shut-off shown in FIGS. 9 and 10.
Figure 12:
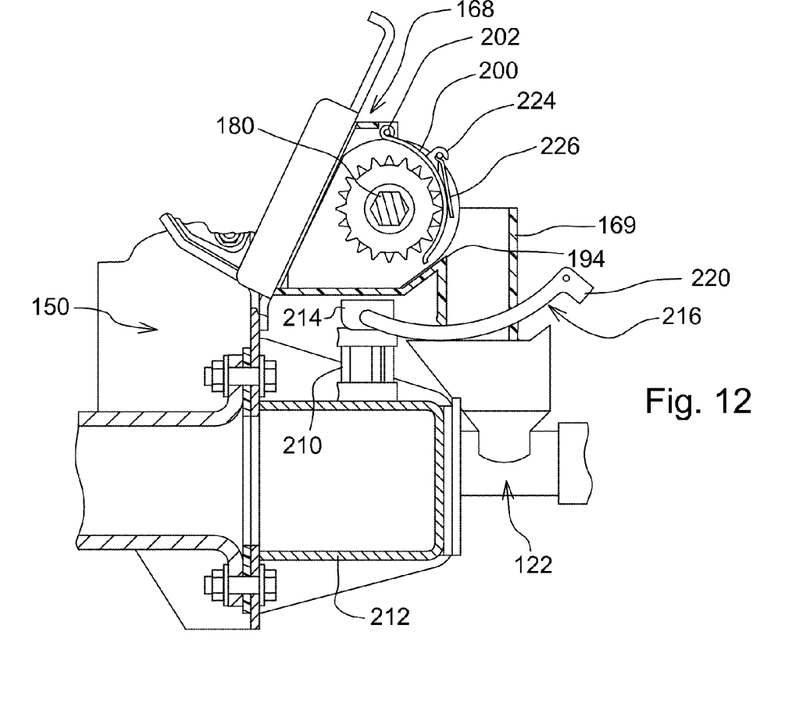
FIG. 12 is side view of the meter of FIG. 9 showing the connecting arm of the shut-off in a released position to enable removal of the meter roller.

During operation, rotation of the roller segments, counterclockwise as shown in FIGS. 9 and 10, causes product flow over the ledge 194 of the feed cup and into the tube 169. A shut-off gate 200 is pivotally mounted to each feed cup at the pivot 202 at the upper end of both the gate and the feed cup. Actuators 210 are mounted to an air manifold 212 formed as part of the meter box assembly with one actuator beneath each feed cup. Each actuator has an extendable rod 213 (FIG. 11) coupled to a clevis 214. A connector arm 216 is coupled to the clevis and extends upward, around the exterior of the feed cup, to the shut-off gate 200. In the preferred embodiment shown, the connector arm is U-shaped have a pair of legs 218, one on each side of the feed cup. The legs are curved to maintain clearance with bearing assemblies (not shown) on the drive shaft 180. At the upper ends of the connector arm, the legs 218 are connected to each other by a cross bar 220. As shown, the connector arm is made of a single molded resin member forming the legs 218 and cross bar 220. The cross bar is also U-shaped itself to arch over the shut-off gate 200. The connector arm could be fabricated of metal instead of molded resin. A pivot pin 222 also extends between the two legs 218 of the connector arm near the cross bar 220. The connector arm is releasably coupled to the shut-off gate 200 by seating the pivot pin 222 into the hooks 224 formed in the shut-off gate 200. A spring clip 226, riveted or otherwise fastened to the gate, bears against the pivot pin 222 to hold the pivot pin seated in the hooks 224.

The actuators 210 are air cylinders that are reverse acting. The rod 213 is normally extended by an internal spring. When the actuators are energized by compressed air, the actuator rod retracts. In the non-energized state, the rod is extended as shown in FIG. 9. This holds the gate 200 in the open position, allowing product to flow through the feed cups when the roller segments of the meter are rotated. When the actuator is energized and the rod is retracted, the gate moves to the closed position shown in FIG. 10, preventing product flow. A suitable air cylinder is a model "Flat I" air cylinder available from Bimba Manufacturing of University Park, Ill. This cylinder is a reverse acting, spring return, rod normally extended cylinder. Electric or hydraulic or other actuators can be used in place of the air cylinder shown. The connector arm can be released from the gate by depressing the spring clip 226 to withdraw the pivot pin 222 from the hooks 224 on the gate. This allows the connector arm to be pivoted around the feed cup to a clearance position shown in FIG. 12 to allow the roller segments 178 and drive shaft 180 to be removed through the open upper end of the feed cups. This enables different size and shaped roller segments to be used in the seed meter. Differently shaped gates 200 may also be used with the different roller segments 178 depending in the size of the roller segments. The gates can be changed by removing the pivot pins 202 attaching the gates to the respective feed cups.

In the embodiment of the invention shown in FIGS. 9-12, the actuators for the shut-off gates are positioned beneath the roller segments and are connected to the respective gates by connector arms that extend around the feed cup. The connector arm can extend around both sides of the feed cup as shown or have only one leg extending around one side of the feed cup. Each actuator can be coupled to more than one shut-off gate by suitable linkage coupled to the connector arms for the reason described above. Alternatively, the actuators can be mounted above the roller segments and have rods that extend downward and connect directly to the shut-off gates. This arrangement may not provide as much access to the roller segments for changing of the segments.

While the invention has been shown and described with a pivoting shut-off gate, other types of motion can be used to move the gate between open and closed positions such as a slide gate as shown in the above referenced patent publication.

The shut-off gate for a volumetric meter of the present invention, located after the meter roller but before product has moved into the air stream, overcomes the challenges described above. The long delay between shut-off and the termination of product discharge at the row is reduced since the meter does not need to empty before product flow ceases. Since the product is stopped before the product enters the air stream, diversion of the product back to the tank is not needed. This avoids the need to separate mixed products and avoids the difficulty of returning product to a pressurized tank. While the invention has been shown and described in the context of an air seeder, it will be appreciated by those skilled in the art that the invention can be used with any volumetric meter such as a grain drill that uses gravity to distribute seed from the meter to the ground.

Having described the preferred embodiment, it will become apparent that various modifications can be made without departing from the scope of the invention as defined in the accompanying claims.

The invention claimed is:

1. A volumetric metering system for metering a product in a seeding machine having a product tank and a distribution system for distributing the metered product having a plurality of separate product runs, said metering system comprising:
   a meter roller having a plurality of roller segments aligned along a roller axis for metering product from the tank to the distribution system;
   a plurality of gates disposed axially along the meter roller between the meter roller and the distribution system with one gate associate with each separate product run of the distribution system, each gate being movable between an open position in which product is allowed to flow from the meter roller to the associated product run of the distribution system and a closed position in which product is prevented from flowing from the meter roller to the associated product run of the distribution system; and
   a plurality of actuators arranged to selectively move the gates from the open to the closed positions, the actuators having extendable rods disconnected from the gates that extend from the respective actuator when the actuator is energized and retract when the actuator is not energized, the extendable rods pushing on the gates to move the gates to the closed positions.

2. The metering system of claim 1 wherein the gates are pivotally mounted for rotation between the open and closed positions.

3. The metering system of claim 1 wherein the actuators are hydraulically controlled.

4. The metering system of claim 1 wherein the actuators are electronically controlled.

5. The metering system of claim 1 further comprising bias means to hold the gates in their open positions when the actuators are in their non-energized state.

6. The metering system of claim 1 further comprising meter casings within which each roller segment is disposed, each meter casing defining an inlet from the tank into the meter casing and an outlet from the meter casing to the distribution system and wherein each gate is pivotally mounted to a meter casing.

7. The metering system of claim 6 further comprising a meter housing and wherein the meter casings and the meter roller are assembled together to form a meter cartridge removably mounted in the housing, and wherein said actuators are mounted to the housing with the extendable rods of the actuators extending into the meter casings.

8. The metering system of claim 7 wherein the actuators each have an extendable rod that is extendable into the meter casing to move the gates to the closed position and which is retractable from the meter casings to enable removal of the meter cartridge from the housing.

9. The metering system of claim 8 further comprising a plunger slidably mounted within each meter casing between the extendable rod of the actuators and the gates wherein the extendable rod of the actuators move the plungers into engagement with the gates to move the gates to the closed positions.

10. The metering system of claim 1 wherein there is one actuator for each gate.

* * * * *